UNITED STATES PATENT OFFICE.

CARL MARIA PIELSTICKER, OF LONDON, COUNTY OF MIDDLESEX, ENGLAND.

ANTISEPTIC.

SPECIFICATION forming part of Letters Patent No. 281,554, dated July 17, 1883.

Application filed November 29, 1882. (No specimens.) Patented in England October 30, 1882, No. 5,153.

*To all whom it may concern:*

Be it known that I, CARL MARIA PIELSTICKER, a subject of the Emperor of Germany, residing at Kilburn, in the city of London, county of Middlesex, and Kingdom of England, have invented a certain new and useful Antiseptic for Preserving Alimentary Substances, (for which I have applied for provisional protection in England, No. 5,153, dated October 30, 1882;) and I do hereby declare that the following is a full, clear, and exact description of the invention, which will enable others skilled in the art to which it appertains to make and use the same.

My invention relates to the preservation of alimentary substances by means of a novel antiseptic.

Many processes have been tried to preserve alimentary substances unaltered in a raw and uncooked state—as, for instance, raw meat and fish—by means of various antiseptics, but only with partial success. Almost invariably it has been found that when exposing substances thus treated to the action of atmospheric air decay and decomposition soon set in, particularly so when the antiseptics have been used as a watery solution. In other instances the natural color or the taste was changed to such an extent as to make the article unfit, or nearly so, as an article of food. No much better result has been obtained by inclosing substances treated with antiseptics in air-tight vessels, because such articles of food contained not only atmospheric air in their bones, pores, and tissues, but it was also impossible, except by the application of heat, to remove the air from the vessels in which the articles previously treated with antiseptics were to be kept.

I am also well aware that attempts have been made to preserve alimentary substances in vapors and gases of various kinds, but without any decided or commercial success.

I obtain the best results by using the following process in conjunction with my novel antiseptic, which I compose by melting together, say, twenty parts of boracic acid, eight parts of phosphate of soda, and two parts of formiate of soda; or I may compose my antiseptic, using as equivalents borax, phosphoric acid, and formiate of soda.

My novel antiseptic may be either used in a pulverulent solid form or in solution.

In carrying out my invention I proceed as follows: The articles to be preserved are either covered with the solid antiseptic for from thirty minutes to several hours, (according to the size or thickness of the article to be preserved,) or the antiseptic may be rubbed into the articles; or the latter may be immersed or impregnated in a closed vessel containing the antiseptic in solution by applying pressure by means of a force-pump or otherwise. I prefer to use a concentrated solution—say, one ounce of the antiseptic in twenty ounces of water, or stronger— which permits me to leave the articles to be preserved for a short time in such solution—say from fifteen minutes to two hours—and still to obtain perfect results without the articles having the chance of taking up an undue and objectionable quantity of moisture, and at the same time losing a portion of their nutritious and savory juices. After the articles to be preserved have taken up a sufficient quantity of the antiseptic they are placed in air-tight vessels or chambers, having an inlet stop-cock near the top or upper end and an outlet stop-cock near the bottom or lower end, but preferably on the same side as the inlet-cock. The inlet-cock as well as the outlet-cock are both opened, and the inlet-cock connected with a gas-holder containing carbonic-acid or carbonic-oxide gas, or a mixture of them, or a mixture of neutral gases in which carbonic-acid or carbonic-oxide gases form one of the principal constituents. I prefer in this gas-holder a pressure of, say, one hundred pounds to the square inch. I now admit the gas into the chamber, and allow it to blow for some time with great force through the chamber, finding its outlet at the second cock, which may be connected with a second or a series of preserving-chambers, in order to use over again and economize the gas. The effect is to remove the atmospheric air to the greatest extent from the chamber or vessel, as well as any of the germs, which otherwise would induce putrefaction.

In order to completely remove all the air from the chamber or the pores and the tissues of the articles to be preserved, the outlet-cock is closed and the gas allowed to assume a certain pressure inside the vessel, (which may be regulated according to a pressure-gage on the chamber or vessel,) so as to completely enter into the bones, pores, and tissues of the articles, and to mix with and to replace the air contained in them. The outlet-cock is then opened, the gas and air blown out for some time, and a like operation repeated, if desired. Finally, the outlet-cock is closed and sealed, and when the gas has assumed again a pressure of, say, five to ten pounds, or more, per square inch inside the chamber or vessel, the inlet-cock is then also closed and sealed and the contents of the vessel are now preserved for a lengthened period. Instead of following this process, the articles to be preserved may be placed in an airtight vessel, the latter to be filled entirely with the antiseptic in solution, and gas admitted by the inlet-cock. When a certain pressure has been obtained inside the vessel, and the solution therefore has entered into all the pores and tissues of the articles, and also replaced the air contained in them in consequence of the pressure obtained by means of the gas, the solution is forced out by opening the outlet-cock, and the gas allowed to blow through the chamber for some time until all the surplus moisture is removed. The latter cock is then closed, and when again a pressure of, say, five to ten pounds, or more, has been obtained inside the preserving-vessel the inlet-cock is then likewise closed.

For very large chambers, especially, and in which, for instance, whole carcasses of meat are to be transported raw and fresh across the ocean, I prefer to proceed as follows: The meat is immersed for, say, ten minutes or more in a concentrated solution of my novel antiseptic, or impregnated by pressure or rubbed or sprinkled with the solid antiseptic. The carcasses are then placed in the preserving-chamber; by preference they are hung up in rows from the ceiling of the chamber, care being taken that they do not touch each other. Between each row of carcasses I place an inlet gas-cock, which, on opening the same, is made to blow or carry with it a small quantity of the antiseptic solution in the form of a very fine spray or mist into and through the chamber, in this way disinfecting the latter and the articles placed in it thoroughly, and finding its way out by an outlet-cock. I may use for this purpose apparatus similar to that used for filling soda-water bottles where water is impinged upon by carbonic-acid gas under pressure inside a closed tube, and blown or forced into the bottle; or I may use any apparatus which I may find suitable for the injection of the spray together with the gas. After a short time the supply of the antiseptic solution is shut off and dry gas allowed to blow through the chamber for some time, until all surplus moisture has been removed. Finally, the outlet-cock is shut, a moderate pressure of gas is allowed to accumulate and is maintained inside the chamber, and the inlet-cock then also closed.

I am well aware that boracic acid has been used in almost every conceivable form as an antiseptic, but, as far as I have been able to find out, never in combination or as a compound with phosphate of soda and formiate of soda, both of which I find to be essential to produce the effects which I desire and have described.

Having fully described my invention, what I desire to claim and secure by Letters Patent is—

The composition or antiseptic salt herein described, for preserving alimentary substances, consisting of boracic acid, phosphate of soda, and formiate of soda, or their described equivalents, the proportions being such as to produce a completely soluble and practically tasteless salt, as set forth.

CARL MARIA PIELSTICKER.

Witnesses:
WILLIAM EDWARD GENGEL,
JOHN FORSTER LENNOX SYKES.